(12) United States Patent
Raghavapillai et al.

(10) Patent No.: US 10,899,939 B2
(45) Date of Patent: Jan. 26, 2021

(54) CROSSLINKABLE FLUORINATED URETHANE ADDITIVES FOR DURABLE EXTERIOR COATINGS

(71) Applicant: THE CHEMOURS COMPANY FC, LLC, Wilmington, DE (US)

(72) Inventors: Anilkumar Raghavapillai, Wilmington, DE (US); Michael Henry Ober, Newark, DE (US); Vincent Franco, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 16/995,979

(22) Filed: Aug. 18, 2020

(65) Prior Publication Data
US 2020/0377742 A1 Dec. 3, 2020

Related U.S. Application Data

(62) Division of application No. 15/569,130, filed as application No. PCT/US2016/029664 on Apr. 28, 2016, now Pat. No. 10,781,283.

(60) Provisional application No. 62/154,761, filed on Apr. 30, 2015.

(51) Int. Cl.
| | | |
|---|---|---|
| C09D 7/65 | (2018.01) |
| C08G 18/67 | (2006.01) |
| C09D 175/16 | (2006.01) |
| C08G 18/34 | (2006.01) |
| C08G 18/24 | (2006.01) |
| C08G 18/28 | (2006.01) |
| C08G 18/08 | (2006.01) |
| C08G 18/22 | (2006.01) |
| C08G 18/38 | (2006.01) |
| C08K 5/00 | (2006.01) |
| C09D 5/16 | (2006.01) |
| C08K 5/205 | (2006.01) |
| C08K 5/21 | (2006.01) |
| C08K 5/3492 | (2006.01) |

(52) U.S. Cl.
CPC ............ *C09D 7/65* (2018.01); *C08G 18/0823* (2013.01); *C08G 18/222* (2013.01); *C08G 18/246* (2013.01); *C08G 18/2825* (2013.01); *C08G 18/2885* (2013.01); *C08G 18/348* (2013.01); *C08G 18/3802* (2013.01); *C08G 18/3825* (2013.01); *C08G 18/3831* (2013.01); *C08G 18/3848* (2013.01); *C08G 18/3851* (2013.01); *C08G 18/672* (2013.01); *C08G 18/6715* (2013.01); *C08K 5/0025* (2013.01); *C09D 5/1687* (2013.01); *C09D 175/16* (2013.01); *C08G 2261/76* (2013.01); *C08K 5/205* (2013.01); *C08K 5/21* (2013.01); *C08K 5/34924* (2013.01)

(58) Field of Classification Search
CPC ...... C09D 7/65; C09D 175/16; C09D 5/1687; C08G 18/672; C08G 18/348; C08G 18/6715; C08G 18/246; C08G 18/2825; C08G 18/0823; C08G 18/222; C08G 18/2885; C08G 18/3802; C08G 18/3825; C08G 18/3831; C08G 18/3848; C08G 18/3851; C08G 2261/76; C08K 5/0025; C08K 5/34924; C08K 5/205; C08K 5/21
See application file for complete search history.

(56) References Cited

U.S. PATENT DOCUMENTS

| | | | |
|---|---|---|---|
| 5,597,874 A | 1/1997 | Anton et al. |
| 5,827,919 A | 10/1998 | May |
| 6,646,088 B2 | 11/2003 | Fan et al. |
| 7,470,745 B2 | 12/2008 | Peng et al. |
| 2004/0192835 A1 | 9/2004 | Steidl et al. |
| 2014/0287242 A1 | 9/2014 | Cleymans et al. |
| 2015/0112036 A1 | 4/2015 | Larichev et al. |

FOREIGN PATENT DOCUMENTS

| | | |
|---|---|---|
| CN | 102977758 A | 12/2012 |
| CN | 103333285 A | 10/2013 |
| CN | 104448211 A | 12/2014 |
| DE | 102008010464 A | 8/2009 |
| EP | 1957089 A2 | 8/2008 |
| FR | 2712291 A1 | 5/1995 |
| JP | 01308420 A | 12/1989 |
| JP | 03106915 A | 5/1991 |
| JP | 08301959 A | 11/1996 |
| KR | 20110088010 A | 8/2011 |
| WO | 9712923 A1 | 4/1997 |
| WO | 2007/067622 A2 | 6/2007 |

OTHER PUBLICATIONS

International Search Report and Written Opinion dated Jul. 26, 2016 in PCT/US2016/029664.
Sheng, et al. Synthesis and properties of fluorine-containing polyurethane-acrylate core-shell emulsion, School of Materials Science and Engineering, East China University of Science and Technology, Shanghai, 200237, Peop. Rep. China, Abstract.
Lin et al., UV-curable low-surface-energy fluorinated poly(urethane-acrylate)s for biomedical applications, European Polymer Journal 44 (2008) 2927-2937.
Canak et al., Synthesis of fluorinated urethane acrylate based UV-curable coatings, Progress in Organic Coatings 76 (2013) 388-99.

(Continued)

*Primary Examiner* — Angela C Scott

(57) ABSTRACT

The invention relates to a crosslinkable fluorinated urethane compound having at least one ethylenically unsaturated functional group. Such compounds are useful as coatings additives such that, when the coating is applied to a substrate, the additive compound is allowed to first migrate to the surface and subsequently crosslink to form a durable oil-, dirt-, and water-repellent surface.

8 Claims, No Drawings

(56) References Cited

OTHER PUBLICATIONS

Surface Coatings vol. I, Raw Materials and Their Usage (Chapman and Hall, New York, NY, Second Edition, 1984).
Morgans, Outlines of Paint Technology (Halstead Press, New York, NY, Third edition, 1990.

CROSSLINKABLE FLUORINATED URETHANE ADDITIVES FOR DURABLE EXTERIOR COATINGS

CROSS REFERENCE TO RELATED APPLICATIONS

This application is a divisional application of U.S. Ser. No. 15/569,130 filed Oct. 25, 2017, which is a national filing under 35 U.S.C. 371 of International Application No. PCT/US2016/029664 filed Apr. 28, 2016 and claims priority of U.S. Provisional Application No. 62/154,761 filed Apr. 30, 2015.

FIELD OF INVENTION

The invention relates to a crosslinkable fluorinated urethane compound having at least one ethylenically unsaturated functional group. Such compounds are useful as coatings additives such that, when the coating is applied to a substrate, the additive compound is allowed to first migrate to the surface and subsequently crosslink to form a durable oil-, dirt-, and water-repellent surface.

BACKGROUND OF THE INVENTION

The coating compositions of interest in the present invention include alkyd coating compositions, urethane coating compositions, water-dispersible coating compositions, and unsaturated polyester coating compositions, typically a paint, clear coating, or stain. All of the above-listed coating compositions after drying or curing often show low hexadecane contact angles, are readily wetted by oil, and are susceptible to soiling. The coating compositions are described in Outlines of Paint Technology (Halstead Press, New York, N.Y., Third edition, 1990) and Surface Coatings Vol. I, Raw Materials and Their Usage (Chapman and Hall, New York, N.Y., Second Edition, 1984).

Fluorinated urethane acrylate coatings have been used as resins for hard coatings. Some compounds, such as those described by Çanak, T. et al., Synthesis of Fluorinated Urethane Acrylate Based UV-Curable Coatings, *Progress in Organic Coatings,* 76 (2013) 388-399, include both fluorinated and olefinic functionality to allow for UV curing once the coating has been applied to a substrate. However, such compounds are designed for or shown to provide dirt pickup resistance when used in small amounts as fluoroadditives for architectural coatings.

SUMMARY OF INVENTION

Water-based latex coating bases, such as those employed as paint coatings, have a tendency to have low oil repellency and poor cleanability ratings. To impart better cleanability to interior and exterior paint surfaces, small molecule additives, including fluorosurfactants, have been used. Due to their small molecular size, however, the additives do not provide long-term performance and durability in exterior paint, which is subjected to more extreme environmental conditions. The additives can wash away from the coating surface within a few days.

The present invention addresses the issues described above by introducing crosslinkable compounds comprised of fluorinated urethanes, incorporating an ethylenically crosslinkable pendant group. Due to the crosslinkable nature of the fluoroadditive, the compositions of the present invention provide performance as well as durability to the water-based latex coatings. Additionally, the low molecular weight allows the polymers to migrate to the coating surface before crosslinking to form a durable additive at the coating surface. The polymers of the invention impart unexpectedly desirable surface effects such as: increased water and oil contact angles, enhanced dirt pickup resistance, and enhanced cleanability to the coating films.

In one embodiment, the invention relates to a crosslinkable compound having at least one ethylenically unsaturated functional group comprising the reaction product of reagents comprising: (a) at least one isocyanate compound having at least 2 isocyanate groups, or mixture of said compounds; (b) at least one perfluoroalkyl mono-alcohol of Formula (I), or a mixture of said fluorinated mono-alcohols;

$$R_f\text{-}Q_v\text{-}OH \qquad (I)$$

wherein $R_f$ is a straight or branched-chain perfluoroalkyl group of 2 to 20 carbon atoms, optionally interrupted by one or more ether oxygens —O—, $CH_2$, CFH, or combinations thereof; Q is a straight chain, branched chain or cyclic structure of alkylene, arylene, aralkylene, sulfonyl, sulfoxy, sulfonamido, carbonamido, carbonyloxy, urethanylene, ureylene, or combinations of such linking groups; and v is 0 or 1; (c) at least one isocyanate-reactive compound having one isocyanate-reactive functional group selected from OH, $NH_2$, or SH, and having at least one ethylenically unsaturated group; (d) at least one isocyanate-reactive compound having at least one terminal carboxylic acid and one isocyanate-reactive functional group selected from OH, $NH_2$, or SH; and (e) optionally, at least one additional isocyanate-reactive compound selected from water, alkoxylated diols, or hydroxyl-functional photoinitiator compounds; provided that if the isocyanate compound (a) has 2 isocyanate groups, then water is present as an additional isocyanate-reactive compound (e).

In another aspect, the invention relates to a process for forming a coating with improved dirt pickup resistance comprising (i) contacting a coating base selected from a water-dispersed coating, an epoxy polymer coating, an alkyd coating, a Type I urethane coating, or an unsaturated polyester coating; with a crosslinkable compound having at least one ethylenically unsaturated functional group to form a coating mixture; (ii) applying the mixture to a substrate to form a coating; (iii) allowing the additive to migrate to the coating surface to form a crosslinkable surface coating, and (iv) subsequently reacting the ethylenically unsaturated groups of the crosslinkable surface coating together; wherein the coating mixture comprises the coating base in an amount of from about 95 to 99.98% and the crosslinkable compound in an amount of from about 0.02 to 5% by weight, based on the total weight of the coating base and the crosslinkable compound; and the crosslinkable compound having at least one ethylenically unsaturated functional group comprises the reaction product of reagents comprising: (a) at least one isocyanate group-containing compound having at least 2 isocyanate groups, or mixture of said compounds; (b) at least one perfluoroalkyl mono-alcohol of Formula (I), or a mixture of said fluorinated mono-alcohols;

$$R_f\text{-}Q_v\text{-}OH \qquad (I)$$

wherein $R_f$ is a straight or branched-chain perfluoroalkyl group of 2 to 20 carbon atoms, optionally interrupted by one or more ether oxygens —O—, $CH_2$, CFH, or combinations thereof; Q is a straight chain, branched chain or cyclic structure of alkylene, arylene, aralkylene, sulfonyl, sulfoxy, sulfonamido, carbonamido, carbonyloxy, urethanylene, ureylene, or combinations of such linking groups; and v is 0 or 1; (c) at least one isocyanate-reactive compound having one isocyanate-reactive functional group selected from OH, $NH_2$, or SH, and having at least one ethylenically unsaturated group; (d) at least one isocyanate-reactive compound having at least one terminal carboxylic acid and one isocyanate-reactive functional group selected from OH, $NH_2$, or SH; and (e) optionally, at least one additional isocyanate-reactive compound selected from water, alkoxylated diols, or hydroxyl-functional photoinitiator compounds; provided that if the isocyanate compound (a) has 2 isocyanate groups, then water is present as an additional isocyanate-reactive compound (e).

DETAILED DESCRIPTION OF INVENTION

Herein all trademarks are designated with capital letters.

The terms "(meth)acrylic" or "(meth)acrylate" indicate, respectively, methacrylic and/or acrylic, and methacrylate and/or acrylate; and the term (meth)acrylamide indicates methacrylamide and/or acrylamide.

By the term "alkyd coating" as used hereinafter is meant a conventional liquid coating based on alkyd resins, typically a paint, clear coating, or stain. The alkyd resins are complex branched and cross-linked polyesters containing unsaturated aliphatic acid residues.

By the term "urethane coating" as used hereinafter is meant a conventional liquid coating based on Type I urethane resins, typically a paint, clear coating, or stain. Urethane coatings typically contain the reaction product of a polyisocyanate, usually toluene diisocyanate, and a polyhydric alcohol ester of drying oil acids. Urethane coatings are classified by ASTM D16 into five categories. Type I urethane coatings contain a minimum of 10% by weight of a pre-reacted autoxidizable binder, characterized by the absence of significant amounts of free isocyanate grous. These are also known as uralkyds, urethane-modified alkyds, oil-modified urethanes, urethane oils, or urethane alkyds. Type I urethane coatings are the largest volume category of polyurethane coatings and include paints, clear coatings, or stains. The cured coating for a Type I urethane coating is formed by air oxidation and polymerization of the unsaturated drying oil residue in the binder.

By the term "unsaturated polyester coating" as used hereinafter is meant a conventional liquid coating based on unsaturated polyester resins, dissolved in monomers and containing initiators and catalysts as needed, typically as a paint, clear coating, stain, or gel coat formulation.

By the term "water-dispersed coatings" as used herein is meant surface coatings intended for the decoration or protection of a substrate, comprising essentially an emulsion, latex, or suspension of a film-forming material dispersed in an aqueous phase, and optionally containing surfactants, protective colloids and thickeners, pigments and extender pigments, preservatives, fungicides, freeze-thaw stabilizers, antifoam agents, agents to control pH, coalescing aids, and other ingredients. Water-dispersed coatings are exemplified by, but not limited to, pigmented coatings such as latex paints, unpigmented coatings such as wood sealers, stains, and finishes, coatings for masonry and cement, and water-based asphalt emulsions. For latex paints the film forming material is a latex polymer of acrylate acrylic, styrene acrylic, vinyl-acrylic, vinyl, or a mixture thereof. Such water-dispersed coating compositions are described by C. R. Martens in "Emulsion and Water-Soluble Paints and Coatings" (Reinhold Publishing Corporation, New York, N.Y., 1965).

By the term "coating base" as used herein is meant a liquid formulation of a water-dispersed coating, an epoxy polymer coating, an alkyd coating, a Type I urethane coating, or an unsaturated polyester coating, which is later applied to a substrate for the purpose of creating a lasting film on said surface. The coating base includes those solvents, pigments, fillers, and functional additives found in a conventional liquid coating. For example, the coating base formulation may include a polymer resin and pigment dispersed in water, where the polymer resin is an acrylic polymer latex, vinyl-acrylic polymer, vinyl polymer, Type I urethane polymer, alkyd polymer, epoxy polymer, or unsaturated polyester polymer, or mixtures thereof.

In one embodiment, the invention relates to a crosslinkable compound having at least one ethylenically unsaturated functional group comprising the reaction product of reagents comprising: (a) at least one isocyanate compound having at least 2 isocyanate groups, or mixture of said compounds; (b) at least one perfluoroalkyl mono-alcohol of Formula (I), or a mixture of said fluorinated mono-alcohols;

$$R_f-Q_v-OH \quad (I)$$

wherein $R_f$ is a straight or branched-chain perfluoroalkyl group of 2 to 20 carbon atoms, optionally interrupted by one or more ether oxygens —O—, $CH_2$, CFH, or combinations thereof; Q is a straight chain, branched chain or cyclic structure of alkylene, arylene, aralkylene, sulfonyl, sulfoxy, sulfonamido, carbonamido, carbonyloxy, urethanylene, ureylene, or combinations of such linking groups; and v is 0 or 1; (c) at least one isocyanate-reactive compound having one isocyanate-reactive functional group selected from OH, $NH_2$, or SH, and at least one ethylenically unsaturated group; (d) at least one isocyanate-reactive compound having at least one terminal carboxylic acid and one isocyanate-reactive functional group selected from OH, $NH_2$, or SH; and (e) optionally, at least one additional isocyanate-reactive compound selected from water, alkoxylated diols, or hydroxyl-functional photoinitiator compounds; provided that if the isocyanate compound (a) has 2 isocyanate groups, then water is present as an additional isocyanate-reactive compound (e). As the at least one isocyanate compound having at least 2 isocyanate groups (a), any diisocyanate or polyisocyanate having predominately two or more isocyanate groups, is suitable for use in this invention. For example, hexamethylene diisocyanate homopolymers are suitable for use herein and are commercially available. It is recognized that minor amounts of diisocyanates can remain in products having multiple isocyanate groups. An example of this is a biuret containing residual small amounts of hexamethylene diisocyanate.

Also suitable for use as the polyisocyanate reactant are hydrocarbon diisocyanate-derived isocyanurate trimers. One specific compound is DESMODUR N-100 (a hexamethylene diisocyanate-based compound available from Bayer Corporation, Pittsburgh, Pa.). Other triisocyanates useful for the purposes of this invention are those obtained by reacting three moles of toluene diisocyanate. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3300, DESMODUR N-3600, DESMODUR Z-4470, DESMODUR H, DESMODUR N3790, and DESMODUR XP 2410, from Bayer Corporation, Pittsburgh, Pa., and bis-(4-isocyanatocylohexyl)methane are also suitable in the invention. Preferred polyisocyanate reactants are the aliphatic and aromatic polyisocyanates containing biuret structures, or polydimethyl siloxane containing isocyanates. Such polyisocyanates can also contain both aliphatic and aromatic substituents.

Hexamethylene diisocyanate homopolymers, which are commercially available as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate, which is available as DESMODUR I (Bayer Corporation); bis-(4-isocyanatocylohexyl)methane, which is available as DESMODUR W (Bayer Corporation); and diisocyanate trimers of Formulas (IIa), (IIb), (IIc), (IId), and (IIe) are useful:

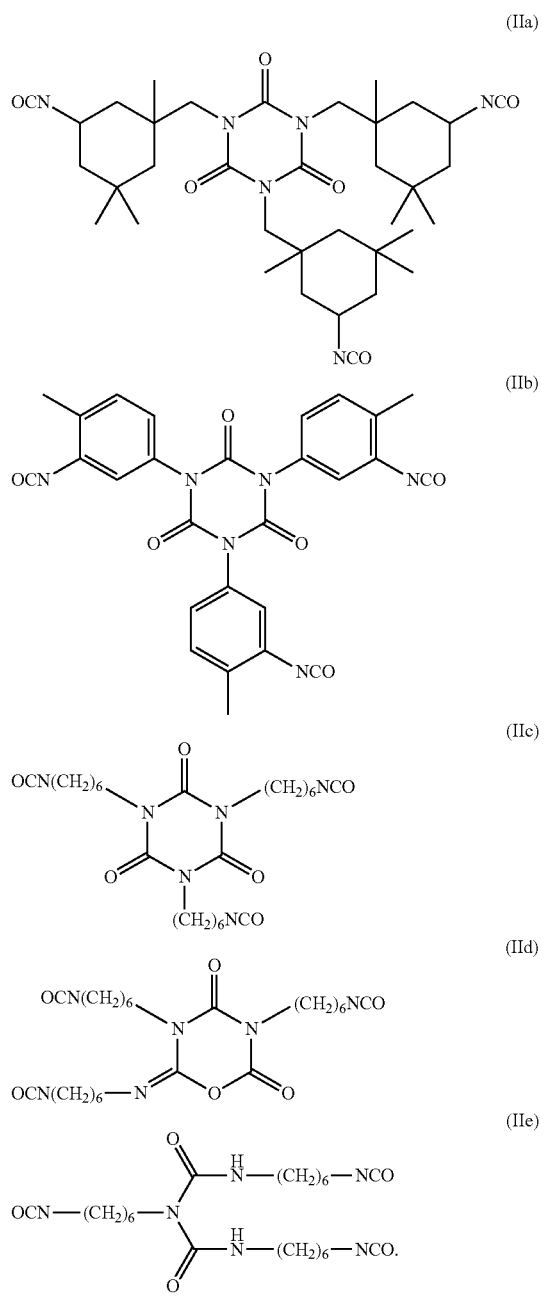

The diisocyanate trimers (IIa-e) are available, for instance as DESMODUR Z4470, DESMODUR IL, DESMODUR N-3300, and DESMODUR XP2410, respectively, from Bayer Corporation.

Fluorinated alcohols are incorporated into the crosslinkable urethane compound as the at least one perfluoroalkyl mono-alcohol compound (b) to improve stain release properties of the end product. Any suitable fluorinated alcohol may be used, including fluorinated alcohols of Formula (I). In Formula (I), $R_f$ and Q may be linear or branched. In one aspect, the fluorinated alcohol is a telomer-based alcohol, where $R_f$ is a linear perfluoroalkyl group, v is 1, and Q is a linear alkylene group. In one aspect, $R_f$ is a $C_1$ to $C_6$ linear or branched perfluoroalkyl group, v is 1, and Q is a linear or branched $C_1$ to $C_6$ alkylene group. In one embodiment, Q is a straight or branched alkylene of 1 to 4 carbon atoms, and in a second embodiment, Q is a straight or branched alkylene of 2 to 4 carbon atoms. Mixtures of fluorinated monomers may also be used.

Suitable fluorinated alcohols include but are not limited to $C_4F_9SO_2NH(CH_2)_3OH$, $C_6F_{13}SO_2NH(CH_2)_3OH$, $C_8F_{17}SO_2NH(CH_2)_3OH$, $C_4F_9SO_2NH(CH_2)_2OH$, $C_6F_{13}SO_2NH(CH_2)_2OH$, $C_8F_{17}SO_2NH(CH_2)_2OH$, $C_4F_9SO_2N(CH_3)(CH_2)_2OH$, $C_6F_{13}SO_2N(CH_3)(CH_2)_2OH$, $C_8F_{17}SO_2N(CH_3)(CH_2)_2OH$, $C_4F_9CH_2CF_2SO_2NH(CH_2)_3OH$, $C_3F_7OCF_2CF_2SO_2NH(CH_2)_3OH$, $C_4F_9CH_2CH_2CF_2CF_2SO_2NH(CH_2)_3OH$, $C_4F_9OCFHCH_2CH_2SO_2NH(CH_2)_3OH$, $C_4F_9SO_2CH_2CH_2NH(CH_2)_3OH$, $C_6F_{13}SO_2CH_2CH_2NH(CH_2)_3OH$, $C_8F_{17}SO_2CH_2CH_2NH(CH_2)_3OH$, $C_4F_9CH_2CH_2SO_2NHCH_2CH_2OH$, $C_6F_{13}CH_2CH_2SO_2NHCH_2CH_2OH$, $C_8F_{17}CH_2CH_2SO_2NHCH_2CH_2OH$, $C_4F_9CH_2CH_2SO_2N(CH_3)CH_2CH_2OH$, $C_6F_{13}CH_2CH_2SO_2N(CH_3)CH_2CH_2OH$, $C_8F_{17}CH_2CH_2SO_2N(CH_3)CH_2CH_2OH$, $C_4F_9(CH_2)_2OH$, $C_6F_{13}(CH_2)_2OH$, $C_8F_{17}(CH_2)_2OH$, $C_4F_9OH$, $C_6F_{13}OH$, $C_8F_{17}OH$, $C_4F_9CH_2CH_2CH_2OH$, $C_6F_{13}CH_2CH_2CH_2OH$, $C_4F_9CH_2OH$, $C_6F_{13}CH_2OH$, $C_4F_9CH_2CF_2CH_2CH_2OH$, $C_6F_{13}CH_2CF_2CH_2CH_2OH$, $C_4F_9CH_2CF_2CH_2CF_2CH_2CH_2OH$, $C_6F_{13}CH_2CF_2CH_2CF_2CH_2CH_2OH$, $C_3F_7OCF_2CF_2CH_2CH_2OH$, $C_2F_{50}CF_2CF_2CH_2CH_2OH$, $CF_3OCF_2CF_2CH_2CH_2OH$, $C_3F_7(OCF_2CF_2)_2CH_2CH_2OH$, $C_2F_5(OCF_2CF_2)_2CH_2CH_2OH$, $CF_3(OCF_2CF_2)_2CH_2CH_2OH$, $C_3F_7OCHFCF_2OCH_2CH_2OH$, $C_2F_5OCHFCF_2OCH_2CH_2OH$, $CF_3OCHFCF_2OCH_2CH_2CH_2OH$, $C_3F_7OCHFCF_2OCH_2CH_2CH_2OH$, $C_2F_5OCHFCF_2OCH_2CH_2CH_2OH$, $CF_3OCHFCF_2OCH_2CH_2OH$, $C_4F_9CH_2CH_2SCH_2CH_2OH$, $C_6F_{13}CH_2CH_2SCH_2CH_2OH$, $C_4F_9SCH_2CH_2OH$, $C_6F_{13}SCH_2CH_2OH$, $C_4F_9CH_2CH_2CF_2CF_2CH_2CH_2OH$, $C_3F_7OCF(CF_3)C(O)NHCH_2CH_2OH$, $C_3F_7OCF(CF_3)C(O)N(CH_3)CH_2CH_2OH$, $C_4F_9NHC(O)NHCH_2CH_2OH$, $C_6F_{13}NHC(O)NHCH_2CH_2OH$, $HCF_2(CF_2)_4CH_2OH$, $HCF_2(CF_2)_6CH_2OH$, $HCF_2(CF_2)_8CH_2OH$, similar variations thereof, and mixtures thereof.

Suitable isocyanate-reactive compounds (c) having at least one isocyanate-reactive group and at least one ethylenically unsaturated group include compounds having any isocyanate-reactive functional group, such as OH, $NH_2$, or SH. In one embodiment, the isocyanate-reactive ethylenically unsaturated compound (c) is selected from hydroxyalkyl vinyl compounds, straight or branched alcohol containing an alkyl chain of 2 to 30 carbons and having 1 to 15 olefinic units, allylic or methallylic polyether alcohols, aminoalkyl vinyl compounds, acrylic or methacrylic alkyl alcohols, acrylic or methacrylic polyether alcohols, or acrylic or methacrylic amines. Specific examples include but are not limited to poly(ethylene glycol) allyl ethers, allyl alcohols including diallyl alcohol, hydroxyethyl (meth)acrylate, hydroxypropyl (meth)acrylate, hydroxybutyl (meth)acrylate, ethoxylated (meth)acrylates, oleic acid, linoleic acid, ricinoleic acid, erucic acid, palmitoleic acid, vaccenic acid, eicosenoic acid, eladic acid, eurucicic acid, nervonic acid, pinolenic acid, arachidonic acid, eicosapentaenoic acid, docosahexanoic acid, eicosadienoic acid, docosatetranoic acid, and mixtures thereof. In one embodiment, the isocyanate-reactive compound (c) has at least two ethylenically unsaturated groups. Some examples include but are not limited to diallyl alcohol and trimethylolpropane diallylether.

Suitable isocyanate-reactive compounds (d) having at least one terminal carboxylic acid and one isocyanate-reactive functional groups include compounds having any isocyanate-reactive functional group, such as OH, $NH_2$, or SH. Examples include but are not limited to hydroxyacetic acid, hydroxypropionic acid, polyacetic acid, polylactic acid, hydroxycaprylic acid, hydroxycapric acid, hydroxylauric acid, hydroxymysteric acid, hydroxypalmitic acid, hydroxystearic acid, hydroxyarachidic acid, hydroxybehenic acid, hydroxylignoceric acid, hydroxypalmitoleic acid, hydroxylineolic acid, hydroxyarachidonic acid, hydroxyoleic acid, or hydroxyerucic acid. Preferred examples include but are not limited to hydroxyacetic acid, hydroxypropionic acid, and polylactic acid. Such compounds may help improve dispersion stability. The final urethane compound, having pendant carboxylic acid groups, may be further neutralized with base, such as ammonia, prior to use as a coatings additive.

Optional additional isocyanate-reactive compounds (e) may be included, such as water, alkoxylated diols, or hydroxyl-functional photoinitiator compounds. Where the isocyanate compound (a) contains only 2 isocyanate functional groups, a crosslinking compound, such as water, is present to allow for incorporation of all three isocyanate-reactive compounds (b), (c), and (d).

Alkoxylated diols may also be incorporated as compound (e) to improve dispersion stability. Such compounds may include, for example, blocks of —$(CH_2CH_2O)_s$(CH($CH_3CH_2O)_t$—H or (C(O)—O—$(CH_2CH_2O)_s$($CH(CH_3)CH_2O)_t$H, where s and t are integers of 0 to 50. In this embodiment, —$(CH_2CH_2O)$— represents oxyethylene groups (EO) and —$(CH(CH_3)CH_2O)$— represents oxypropylene groups (PO). These polyethers can contain only EO groups, only PO groups, or mixtures thereof. These polyethers can also be present as a tri-block copolymer designated PEG-PPG-PEG (polyethylene glycol-polypropylene glycol-polyethylene glycol). In one aspect, the alkoxylated diols have an average molecular weight equal to or greater than about 200. In another aspect, the average molecular weight is between 350 and 2000.

When hydroxy-functional photoinitiator compounds are used, they serve to initiate curing once the crosslinkable urethane compound has migrated to the coating surface. Because the photoinitiators are covalently bound to the crosslinkable urethane compound, they are already present at the desired crosslinking site.

The crosslinkable compounds are preferably part of an aqueous composition but may further comprise a solvent selected from organic solvents. The aqueous composition may be in the form of an aqueous solution, an aqueous emulsion, or an aqueous dispersion. In one embodiment, the crosslinkable compounds can be made in one step. In another embodiment, the synthesis can be completed sequentially. A sequential addition is especially useful when employing polyfunctional compounds such as water or alkoxylated diols. In this case, molar concentrations of the isocyanate-reactive compounds (b), (c), and (d) are used such that there remains unreacted isocyanate groups to react with compound (e). In one embodiment, compound (b) is used in an amount of 10 to 89 mol %, in another embodiment, an amount of 30 to 78 mol %, and in a third embodiment, 30 to 70 mol %. In one aspect, compound (c) is used in an amount of 1 to 25 mol %, in another embodiment, 1 to 15 mol %, and in a third embodiment, 1 to 10 mol %. In one embodiment, compound (d) is used in an amount of 10 to 80 mol %, in another embodiment, an amount of 20 to 68 mol %, and in a third embodiment, 20 to 60 mol %. In one embodiment, compound (e) is used in an amount of 0 to 25 mol %, in another embodiment, 1 to 20 mol %, and in a third embodiment, 1 to 10 mol %. All mol % amounts are based on the molar sum of isocyanate-reactive compounds.

This reaction is typically conducted by charging a reaction vessel with compounds (a) to (d), and optionally an additional isocyanate-reactive compound (e). The order of reagent addition is not critical, but if water is used, the water should be added after the isocyanate(s) and compounds (b), (c), and (d). The specific weight of the reactants charged is based on their equivalent weights and on the working capacity of the reaction vessel, and is adjusted so that substituted sugar alcohol will be consumed in the first step. A suitable dry organic solvent free of isocyanate-reactive groups is typically used as a solvent. Ketones are the preferred solvents, and methylisobutylketone (MIBK) is particularly preferred for convenience and availability. The charge is agitated, and temperature adjusted to about 40° C. to 70° C. Typically, a catalyst such as iron(III) chloride in an organic solvent is then added, typically in an amount of from about 0.01 to about 1.0 weight % based on the dry weight of the composition, and the temperature is raised to about 80° C. to 100° C. A co-catalyst, such as sodium carbonate, may also be used. If water is to be added, the initial reaction is conducted so that less than 100% of the isocyanate groups are reacted. In the second step after holding for several hours, additional solvent, water, and optionally a second compound are added. In one embodiment, the mixture is allowed to react for several more hours or until all of the isocyanate has been reacted. Additional water can then be added along with surfactants, if desired, for the purpose of dispersion and stirred until thoroughly mixed. Following a homogenization or sonification step, the organic solvent can be removed by evaporation at reduced pressure. It will be apparent to one skilled in the art that many changes to any or all of the above procedures can also be used to optimize the reaction conditions for obtaining maximum yield, productivity, or product quality.

The fluoropolymer composition produced as described above may be used directly in a coating composition, or added solvent (the "application solvent") may be added to achieve a desirable solids content. The application solvent is typically a solvent selected from the group consisting of alcohols and ketones. The fluoropolymer composition is useful as a coating additive, wherein the fluoropolymer composition can be added to a coating base, which is applied to a substrate. When the coating is applied to a substrate, the additive compound is allowed to first migrate to the surface and subsequently crosslink to form a durable oil-, dirt-, and water-repellent surface.

Thus, the invention relates to a composition comprising (a) a coating base selected from a water-dispersed coating, an epoxy polymer coating, an alkyd coating, a Type I urethane coating, or an unsaturated polyester coating; and (b) a crosslinkable additive, where the crosslinkable additive is the crosslinkable compound described above; wherein the composition comprises (a) in an amount of from about 95 to 99.98% and (b) in an amount of from about 0.02 to 5% by weight, based on the total weight of (a) and (b).

As noted above, the coating base is a liquid formulation of a water-dispersed coating, an epoxy polymer coating, an alkyd coating, a Type I urethane coating, or an unsaturated polyester coating, which is later applied to a substrate for the purpose of creating a lasting film on said surface. In one embodiment, the coating base comprises a polymer which having pendant hydroxyl or carboxylic acid groups. The coating base includes those solvents, pigments, fillers, and functional additives found in a conventional liquid coating. Typically, the coating base may include a resin compound from 10 to 60% by weight, from 0.1 to 80% by weight of functional additives including pigments, fillers, and other additives, and the balance of the coating base composition is water or solvent. For an architectural coating, the resin compound is in an amount of about 30 to 60% by weight, functional additives including pigments, extenders, fillers, and other additives are in an amount of 0.1 to 60% by weight, with the balance being water or solvent.

The coating compositions may further comprise additional components to provide surface effects to the resulting coating. For example, the composition may further comprise a non-polymeric ethylenically unsaturated crosslinkable compound to provide additional crosslinking sites for the crosslinkable polymer compound. In one embodiment, this non-polymeric crosslinkable compound is a fatty acid compound in an amount of about 0.001 to 1% by weight, based on the total weight sum of the coating base, the crosslinkable compound, and the fatty acid. Any fatty acid, including oleic acid, linoleic acid, ricinoleic acid, erucic acid, palmitoleic acid, vaccenic acid, eicosenoic acid, eladic acid, eurucicic acid, nervonic acid, pinolenic acid, arachidonic acid, eicosapentaenoic acid, docosahexanoic acid, eicosadienoic acid, docosatetranoic acid, and mixtures thereof, may be employed. Cure initiators, including photoinitiators, may also be included in the coating compositions, either as part of the coating base formulation or as an additional additive.

The coating compositions may also include a pigment. Such a pigment may be part of the coating base formulation, or may be added subsequently. Any pigment can be used with the present invention. The term "pigment" as used herein means opacifying and non-opacifying ingredients which are particulate and substantially non-volatile in use. Pigment as used herein includes ingredients labeled as pigments, but also ingredients typically labeled in the coating trade as inerts, extenders, fillers, and similar substances.

Representative pigments that can be used with the present invention include, but are not limited to, rutile and anatase $TiO_2$, clays such as kaolin clay, asbestos, calcium carbonate, zinc oxide, chromium oxide, barium sulfate, iron oxide, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, diatomaceous earth, glass fibers, glass powders, glass spheres, MONASTAL Blue G (C.I. Pigment Blue 15), molybdate Orange (C.I. Pigment Red 104), Toluidine Red YW (C.I. Pigment 3)-process aggregated crystals, Phthalo Blue (C.I. Pigment Blue 15)-cellulose acetate dispersion, Toluidine Red (C.I. Pigment Red 3), Watchung Red BW (C.I. Pigment Red 48), Toluidine Yellow GW (C.I. Pigment Yellow 1), MONASTRAL Blue BW (C.I. Pigment Blue 15), MONASTRAL Green BW (C.I. Pigment Green 7), Pigment Scarlet (C.I. Pigment Red 60), Auric Brown (C.I. Pigment Brown 6), MONASTRAL Green G (C.I. Pigment Green 7), MONASTRAL Maroon B, MONASTRAL Orange, and Phthalo Green GW 951.

Titanium dioxide ($TiO_2$) is the preferred pigment to use with the present invention. Titanium dioxide pigment, useful in the present invention, can be in the rutile or anatase crystalline form. It is commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference.

When used as an additive to a coating base, the crosslinkable polymer compound is effectively introduced to the coating base by thoroughly contacting, e.g., by mixing the fluoropolymer composition with the coating base. The contacting of fluoropolymer and coating base can be performed, for example and conveniently, at ambient temperature. More elaborate contacting or mixing methods can be employed such as using a mechanical shaker or providing heat. Such methods are generally not necessary and generally do not substantially improve the final coating composition.

When used as an additive to a coating base, the composition of the invention is generally added at about 0.02 weight % to about 5 weight % on a dry weight basis of the fluoropolymer to the weight of the wet paint. In one embodiment, from about 0.02 weight % to about 0.5 weight % is used, and in a third embodiment, from about 0.05 weight % to about 0.25 weight % of the crosslinkable polymer compound is added to the paint.

In another embodiment, the invention relates to a process for forming a coating with improved dirt pickup resistance comprising (i) contacting a coating base selected from a water-dispersed coating, an epoxy polymer coating, an alkyd coating, a Type I urethane coating, or an unsaturated polyester coating; with a crosslinkable compound having at least one ethylenically unsaturated functional group to form a coating mixture; (ii) applying the mixture to a substrate to form a coating; (iii) allowing the additive to migrate to the coating surface to form a crosslinkable surface coating, and (iv) subsequently reacting the ethylenically unsaturated groups of the crosslinkable surface coating together; wherein the coating mixture comprises the coating base in an amount of from about 95 to 99.98% and the crosslinkable compound in an amount of from about 0.02 to 5% by weight, based on the total weight of the coating base and the crosslinkable compound; and the crosslinkable compound having at least one ethylenically unsaturated functional group comprises the reaction product of reagents comprising: (a) at least one isocyanate compound having at least 2 isocyanate groups, or mixture of said compounds; (b) at least one perfluoroalkyl mono-alcohol of Formula (I), or a mixture of said fluorinated mono-alcohols;

$$R_f\text{-}Q_v\text{-}OH \qquad (I)$$

wherein $R_f$ is a straight or branched-chain perfluoroalkyl group of 2 to 20 carbon atoms, optionally interrupted by one or more ether oxygens —O—, $CH_2$, CFH, or combinations thereof; Q is a straight chain, branched chain or cyclic structure of alkylene, arylene, aralkylene, sulfonyl, sulfoxy, sulfonamido, carbonamido, carbonyloxy, urethanylene, ureylene, or combinations of such linking groups; and v is 0 or 1; (c) at least one isocyanate-reactive compound having one isocyanate-reactive functional group selected from OH, $NH_2$, or SH, and at least one ethylenically unsaturated group; (d) at least one isocyanate-reactive compound having at least one terminal carboxylic acid and one isocyanate-reactive functional group selected from OH, $NH_2$, or SH; and (e) optionally, at least one additional isocyanate-reactive compound selected from water, alkoxylated diols, or hydroxyl-functional photoinitiator compounds; provided that if the isocyanate compound (a) has 2 isocyanate groups, then water is present as an additional isocyanate-reactive compound (e).

The coating compositions of the present invention are useful for providing a protective and/or decorative coating to a wide variety of substrates. Such substrates include primarily construction materials and hard surfaces. The substrate is preferably selected from the group consisting of wood, metal, wallboard, masonry, concrete, fiberboard, and paper. Other materials may also be used as the substrate.

The coatings of the present invention may be used to treat a substrate by contacting the substrate with a coating composition comprising a coating base and a polymer composition of formula (I) and drying or curing the coating composition on the substrate. Any method of contacting a coating composition with a substrate can be used. Such methods are well known to a person skilled in the art, such as by brush, spray, roller, doctor blade, wipe, dip, foam, liquid injection, immersion or casting. Following application of the coating to a substrate, the polymer compound is polymerized using any conventional means, including allowing the additive to crosslink in air by oxidative curing. Radiation curing, including UV curing, may also be employed. Cure initiators and additives may be combined with the coating compositions to improve cure efficiency.

The compositions of the present invention provide performance as well as durability to coatings. They impart unexpectedly desirable surface effects such as: increased water and oil contact angles, enhanced dirt pickup resistance, and enhanced cleanability to the coating films. For these reasons, the compounds of the present invention are particularly suitable for use as additives to exterior coating and paints.

MATERIALS AND TEST METHODS

All solvents, monomers and reagents, unless otherwise indicated, were purchased from Sigma-Aldrich and used directly as supplied. DESMODUR N3300 was obtained from Bayer Material Science LLC. IRGACURE 2959 is a hydroxy-functional photoinitiator, obtained from BASF. 1H,1H,2H,2H-perfluorooctanol was obtained from E. I. DuPont de Nemours & Co, Wilmington, Del.

Test Methods

Dosing of Crosslinkable Urethene Additives in Paint and Test Panel Application

Aqueous dispersions of fluoroacrylic copolymers of the present invention were added at 350 ppm fluorine levels to selected commercially available interior and exterior latex paints that were, prior to dosing, free of fluoroadditives. The sample was mixed using an overhead Cowles Blade stirrer at 600 rpm for 10 minutes. The mixture was then transferred to a glass bottle, sealed and placed on a roll mill overnight to allow uniform mixing of the fluoropolymer. The samples were then drawn down uniformly on a black Leneta Mylar® card (5.5"×10") or Aluminium Q-panel (4"×12") via a BYK-Gardner drawdown apparatus using 5 mL bird-applicator. The paint films were then allowed to dry at room temperature for 7 days.

Test Method 1. Evaluation of Oil Repellency Via Contact Angle Measurement

Oil contact angle measurements were used to test for the migration of fluoroadditive to the surface of the paint film. Oil contact angle testing was performed by goniometer on 1 inch strips of Leneta panel coated with dried paint film.

A Ramé-Hart Standard Automated Goniometer Model 200 employing DROP image standard software and equipped with an automated dispensing system, 250 µl syringe, and illuminated specimen stage assembly was used. The goniometer camera was connected through an interface to a computer, allowing the droplet to be visualized on a computer screen. The horizontal axis line and the cross line could both be independently adjusted on the computer screen using the software.

Prior to contact angle measurement, the sample was placed on the sample stage and the vertical vernier was adjusted to align the horizontal line (axis) of the eye piece coincident to the horizontal plane of the sample. The horizontal position of the stage relative to the eye piece was positioned so as to view one side of the test fluid droplet interface region at the sample interface.

To determine the contact angle of the test fluid on the sample, approximately one drop of test fluid was dispensed onto the sample using a 30 µL pipette tip and an automated dispensing system to displace a calibrated amount of the test fluid. For oil contact angle measurements, hexadecane was suitably employed. Horizontal and cross lines were adjusted via the software in case of the Model 200 after leveling the sample via stage adjustment, and the computer calculated the contact angle based upon modeling the drop appearance. The initial contact angle is the angle determined immediately after dispensing the test fluid to the sample surface. Initial contact angles above 30 degrees are indicators of effective oil repellency.

Test Method 2. Dirt Pick-Up Resistance (DPR) Test for Exterior Paints

DPR testing was used to evaluate the ability of the painted panels to prevent dirt accumulation. An artificial dry dirt comprised of silica gel (38.7%), aluminum oxide powder (38.7%), black iron oxide powder (19.35%) and lamp black powder (3.22%) was used for this test. The dust components were mixed and placed on a roller for 48 hours for thorough mixing and stored in a decicator.

Exterior paint samples were drawn down to Aluminium Q-panels cut to a size of 1.5"×2", and four replicates of these samples were taped onto a 4"×6" metal panel. The initial whiteness ($L^*_{initial}$) of each Q-panel was measured using a Hunter Lab colorimeter. The 4"×6" metal panel was then inserted into a 45 degree angle slot cut in a wooden block. The dust applicator containing metal mesh dispensed the dust on the panels until the panels were completely covered with dust. The excess dust was then removed by lightly tapping the mounted panels 5 times on the wooden block inside the shallow tray. The 4"×6" panel which held the dusted panels was then clamped onto a Vortex-Genie 2 for 60 seconds to remove any remaining dust. The panel was then removed and tapped 10 times to dislodge any remaining dust. The whiteness ($L^*_{dusted}$) of each 1.5"×2" sample was re-measured using the same colorimeter, and the difference in whiteness before and after dusting was recorded. The values were averaged. DPR is expressed in terms of $\Delta L^*$, where $\Delta L^* = (L^*_{initial} - L^*_{dusted})$. A lower $\Delta L^*$ value indictes better dirt pick-up resistance.

Test Method 3. Water Wash Durability (Oil Contact Angle)

Exterior paint samples were drawn down to Aluminum Q-panels cut to a size of 1.5"×2", fixed at an angle of 45°, and set to wash with running water for five minutes at a flow rate of 1 L/minute. The samples were air dried for 7 days, and oil contact angles were then measured as described in Test Method 1.

Test Method 4. Weathering (WOM) for DPR and Oil Contact Angle Durability

Accelerated weathering of coated Q-panels was performed in an ATLAS Ci5000 Xenon Lamp Weather-o-Meter. The Xenon lamp was equipped with Type S Boro Inner and Outer Filters. Weathering cycles were performed according to D6695, cycle 2. During the weathering period, the panels were subjected to repeated 2-hour programs, which included 18 minutes of light and water spray followed by 102 minutes of light only. During the entire program, panels were held at 63° C. and during the UV only segment relative humidity was held at 50%.

For a 24-hour WOM program, freshly coated aluminum Q-panels were allowed to air dry for 7-days. The initial whiteness (L*initial) of each Q-panel was measured using a Hunter Lab colorimeter. One set of panels was subjected to DPR testing (as per Test Method 2) as well as oil and water contact angle testing (as per Test Method 1). A duplicate set of panels was placed in the weather-o-meter and allowed to proceed through 12 continuous 2-hour cycles according to the description above. After completion of the weathering cycles, the panels were dried, evaluated according to Test Methods 1 and 2, and re-subjected to DPR.

Example 1

DESMODUR N3300 (6.68 g) was added to a round-bottomed flask with magnetic stir bar kept under $N_2$ atmosphere. Methyl isobutyl ketone (MIBK) (10.9 g), 1H,1H,2H,2H-perfluorooctanol (4.16 g, 11.44 mmol), glycolic acid (0.74 g, 9.7 mmol), poly(ethyleneglycol)monomethacrylate (MW 526, 3.1 g, 5.89 mmol), trimethylolpropane diallylether (1.40 g, 5.89 mmol) and IRGACURE 2959 (0.39 g, 1.73 mmol) were added. The reaction mixture was heated to 60° C. and charged with catalytic dibutyltin dilaurate (0.02 g) in MIBK (0.7 g). The reaction mixture was then heated to 90° C. for 12 hours. The reaction mixture turned to a thick yellow liquid. The mixture was then cooled to 50° C. A neutralizing solution of $NH_4OH$ (0.59 g, 9.7 mmol $NH_3$) in $H_2O$ (38 mL) was then added. A white slurry formed at pH ~10 and the contents then stirred with heating at 50° C. for for 30 minutes. A sample was taken for weight percent solids analysis and was determined to be 14.6% by weight. A calculated amount of this dispersion (350 ppm of F) was added to samples of exterior test paint and the drawdown panels evaluated as per the test methods described.

Example 2

DESMODUR $N_{3300}$ (3.86 g) was added to a round-bottomed flask with magnetic stir bar kept under $N_2$ atmosphere. MIBK (16.5 g), 1H,1H,2H,2H-perfluorooctanol (2.18 g, 6.0 mmol), 2,2-bis(dihydroxymethyl) propionic acid (1.6 g, 12.0 mmol) and poly(ethyleneglycol)monomethacrylate (Mw 526, 0.84 g, 1.6 mmol) were added, followed by catalytic dibutyltin dilaurate (0.013 g) The reaction was then heated to 90° C. for four hours. Water (16.5 g) and concentrated $NH_4OH$ (0.83 g, 13.63 mmol $NH_3$) was added, and the reaction was heated to 90° C. for 3 hours to obtain a white dispersion. Evaporation of solvents under reduced pressure obtained urethane dispersion as a white slurry. A sample was taken for weight percent solids analysis (23% by weight). A calculated amount of this dispersion (350 ppm of F) was added to samples of exterior test paint and the drawdown panels were evaluated as per the test methods described.

Example 3

DESMODUR N3300 (1153.85 g) was added to a reactor with mechanical stirring, kept under $N_2$ atmosphere. Methyl isobutyl ketone (MIBK) (3693.88 g), 1H,1H,2H,2H-pefluorooctylalcohol (1006.58 g, 2764.5 mmol), and iron chloride (0.24 g) in MIBK (47.84 g) were added. The reaction mixture was heated to 90° C. for 2 hours. Oleyl alcohol (91.91 g, 291.00 mmol) was added. The reaction mixture was kept at 90° C. for another 2 hours. Glycolic acid (210.24 g, 2764.5 mmol) was added. The reaction mixture was then kept at 90° C. for 18 hours. Water (6.49 g) was added for cross-linking. The mixture was kept at 90° C. for 1 hour, then cooled to 70° C. Sodium dodecylbenzene sulfonate (73.88 g) in water (15772.29 g) was added via an addition funnel over 30 minutes. The mixture was kept at 70° C. for 18 hours. Concentrated $NH_4OH$ in water (28%, 168.14 g, 2764.50 mmol $NH_3$) was added. A white slurry formed at pH 7 and the contents then stirred with heating at 70° C. for 30 minutes. The mixture was homogenized via milk homogenizer. Evaporation of solvents under reduced pressure obtained a urethane dispersion as a white slurry at 15.6% by weight solids. A calculated amount of this dispersion (350 ppm of F) was added to samples of exterior test paint and the drawdown panels were evaluated as per the test methods described.

Comparative Example A

A round-bottomed flask with reflex condenser, temperature probe, magnetic stir bar, and $N_2$ atmosphere was charged with isophoronediisocyanate (5 g, 22.5 mmol) in MIBK (22 mL). A solution of 1H,1H,2H,2H-perfluorooctan-1-ol (4.3 g, 11.8 mmol) and poly(ethylene glycol) monomethyl ether ($M_n$ about 750, 8.85 g, 11.8 mmol) in MIBK (24 mL) was then added. The mixture was heated to 80° C., and dibutyltin dilaurate (0.01 g) was charged. The mixture was heated for 20 hours. Dihydroxymethylpropionic acid (3.02 g, 22.5 mmol) in MIBK (22 mL) was then added and the mixture was heated at 80° C. for 12 hours. The urethane solution was then neutralized with $NH_4OH$ and the organics were removed under reduced pressure. The dispersion was found to be 27% by weight solids.

Comparative Example B

Samples of exterior test paint, without additive, were applied to drawdown panels and evaluated as per the test methods described.

TABLE 1

Oil Contact Angle and Dirt Pickup Resistance Performance

| | Oil Contact Angle* | | | Dirt Pickup Resistance** | |
|---|---|---|---|---|---|
| Example | Initial | Water Wash | After WOM | Initial | After WOM |
| 1 | 74 | 62 | 36 | 1.8 | 1.4 |
| 2 | 69 | 58 | 33 | 2.2 | 2.7 |

TABLE 1-continued

Oil Contact Angle and Dirt Pickup Resistance Performance

| | Oil Contact Angle* | | | Dirt Pickup Resistance** | |
|---|---|---|---|---|---|
| Example | Initial | Water Wash | After WOM | Initial | After WOM |
| 3 | 68 | 62 | 43 | 2.9 | 6.7 |
| A | 70 | 29 | 22 | 3.1 | 4.5 |
| B | 0 | 0 | 0 | 8.5 | 10.2 |

*A higher value indicates better contact angle performance.
**A lower value indicates better DPR performance.

The data indicated that the crosslinkable urethanes showed excellent initial DPR and oil contact angle compared to Comparative Example B where no additive was present. Additionally, the crosslinkable urethanes of Example 1-3 showed excellent oil contact angle retention upon water wash and WOM compared to comparative Example A where no olefinic crosslinkable groups were present. All examples also showed good DPR compared to Comparative Example B after WOM.

What is claimed is:

1. A crosslinkable compound having at least one ethylenically unsaturated functional group comprising the reaction product of reagents comprising:
    (a) at least one isocyanate compound having at least 2 isocyanate groups, or a mixture of said compounds;
    (b) at least one perfluoroalkyl mono-alcohol of Formula (I), or a mixture of said fluorinated mono-alcohols;

$$R_f-Q_v-OH \quad (I)$$

wherein
    $R_f$ is a straight or branched-chain perfluoroalkyl group of 2 to 20 carbon atoms, optionally interrupted by one or more ether oxygens —O—, $CH_2$, CFH, or combinations thereof;
    Q is a straight chain, branched chain or cyclic structure of alkylene, arylene, aralkylene, sulfonyl, sulfoxy, sulfonamido, carbonamido, carbonyloxy, urethanylene, ureylene, or combinations of such linking groups; and
    v is 0 or 1;
    (c) at least one isocyanate-reactive compound having one isocyanate-reactive functional group selected from OH, $NH_2$, or SH, and having at least one ethylenically unsaturated group;
    (d) at least one isocyanate-reactive compound having at least one terminal carboxylic acid and one isocyanate-reactive functional group selected from OH, $NH_2$, or SH; and
    (e) optionally, at least one additional isocyanate-reactive compound selected from water, alkoxylated diols, or hydroxyl-functional photoinitiator compounds;
    provided that if the isocyanate compound (a) has 2 isocyanate groups, then water is present as an additional isocyanate-reactive compound (e).

2. The crosslinkable compound of claim 1, where $R_f$ is a $C_1$ to $C_6$ perfluoroalkyl group, v is 1, and Q is a $C_1$ to $C_6$ alkylene group.

3. The crosslinkable compound of claim 1, where the at least one isocyanate-reactive compound (c) is selected from hydroxyalkyl vinyl compounds, straight or branched alcohol containing an alkyl chain of 2 to 30 carbons and having 1 to 15 olefinic units, allylic or methallylic polyether alcohols, aminoalkyl vinyl compounds, acrylic or methacrylic alkyl alcohols, (meth)acrylic polyether alcohols, or (meth)acrylic amines.

4. The crosslinkable compound of claim 1, where the at least one isocyanate-reactive compound (d) is selected from hydroxyacetic acid, hydroxypropionic acid, or polylactic acid.

5. The crosslinkable compound of claim 1, where the at least one isocyanate-containing compound is selected from compounds of Formulas (IIa), (IIb), (IIc), (IId), and (IIe):

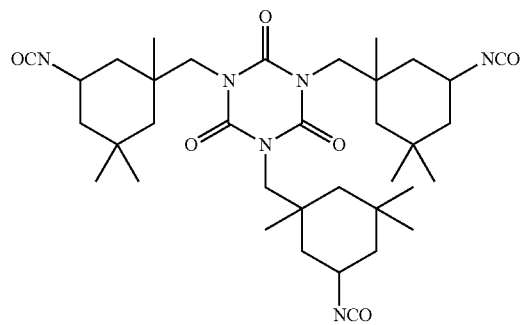
(IIa)

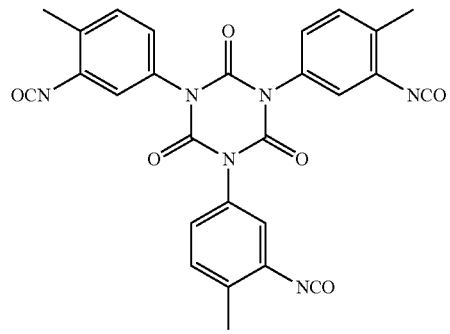
(IIb)

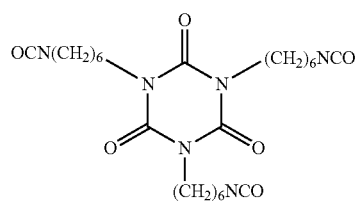
(IIc)

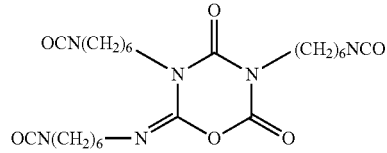
(IId)

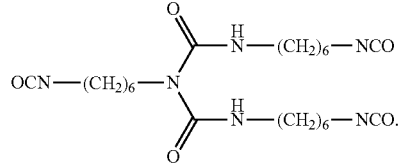
(IIe)

6. The crosslinkable compound of claim 1, where compound (e) is present.

7. A process for forming a coating with improved dirt pickup resistance comprising (i) contacting a coating base selected from a water-dispersed coating, an epoxy polymer coating, an alkyd coating, a Type I urethane coating, or an unsaturated polyester coating; with a crosslinkable compound of claim 1 to form a coating mixture;

(ii) applying the coating mixture to a substrate to form a coating;

(iii) allowing the crosslinkable compound to migrate to the coating surface to form a crosslinkable surface coating, and (iv) subsequently reacting the ethylenically unsaturated groups of the crosslinkable surface coating together; and wherein the coating mixture comprises the coating base in an amount of from about 95 to 99.98% and the crosslinkable compound in an amount of from about 0.02 to 5% by weight, based on the total weight of the coating base and the crosslinkable compound.

8. The process of claim 7, where the substrate is selected from the group consisting of wood, metal, wallboard, masonry, concrete, fiberboard, and paper.

\* \* \* \* \*